Patented Jan. 5, 1954

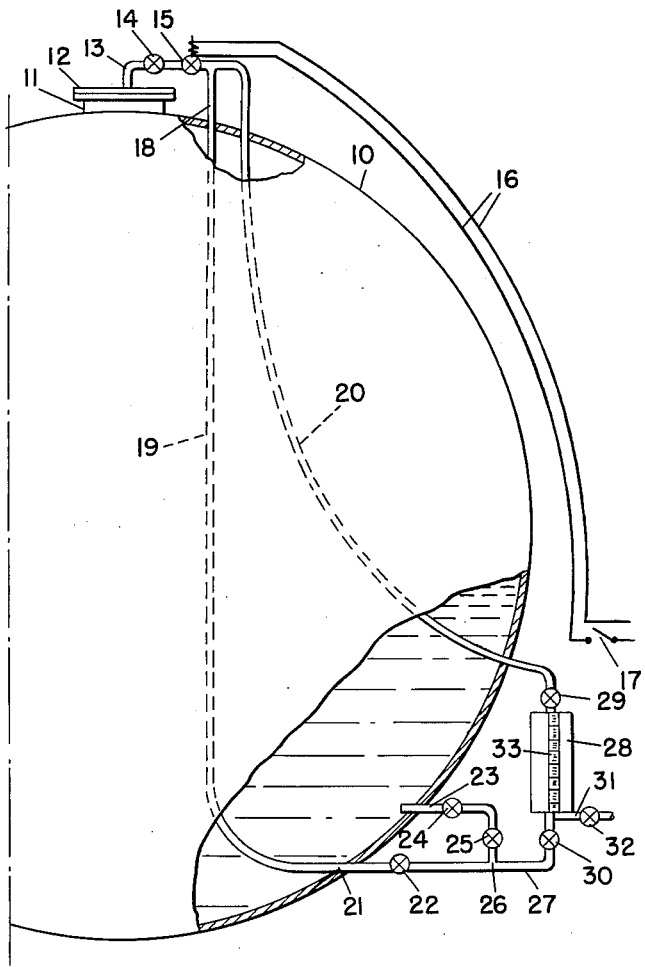

2,664,748

UNITED STATES PATENT OFFICE 2,664,748

CALIBRATED LIQUID STORAGE GAUGE

Harold A. Quist, Swarthmore, Pa., assignor to Sun Oil Company, Philadelphia, Pa., a corporation of New Jersey Original application November 16, 1946, Serial No. 710,279. Divided and this application August 16, 1951, Serial No. 242,067

3 Claims. (Cl. 73—290)

The present invention relates to apparatus for indicating and gauging the liquid level within a storage tank.

This application is a division of Patent No. 2,588,875, dated March 11, 1952, for Improvement in a Calibrated Liquid Level Gauge.

It is a principal object of this invention to provide an improved apparatus for indicating and accurately gauging at a remote and if desired ground level location the amount of liquid contained in a relatively large liquid storage tank.

The liquid storage tanks such as are commonly seen at oil refineries are of various sizes and shapes and are customarily provided with some means of indicating the liquids contained therein. In the past, such liquid indicating means has usually shown the liquid level and comprised either a complicated system of floats and levers or a combination of floats and auxiliary air pressure apparatus. These various forms of liquid level indicators have proved troublesome and inaccurate in operation in view of the many chances for failure of the apparatus due to the float becoming liquid logged and sinking, or the float becoming fouled or corroded and sticking to its guiding device. Furthermore, such float apparatus is affected by fluid currents causing inaccurate indications to be obtained. Also, within the tank the air pressure apparatus is another potential source of trouble which requires frequent inspection and maintenance to avoid complications and inaccuracies.

It is an important object of this invention to overcome the above and other disadvantages of the previously known liquid level indicating systems for relatively large liquid storage tanks by providing an improved apparatus for liquid level indicating and gauging, the apparatus having no moving parts or floats and capable of accurately and remotely indicating and gauging the contents of a storage tank by a measurement of relative volumes of liquid.

Further objects and advantages of the invention will be apparent by reference to the following specifications and drawing in which:

The figure of the drawing is a fragmentary elevation partly broken away showing a portion of a liquid storage tank to which the liquid level indicator has been applied.

In the drawing, a relatively large liquid storage tank 10 is shown. This tank may be of any shape or size although a tank of the spheroid type is shown for the purpose of illustration. At the top of the tank 10 is a flanged opening 11 closed by a cover plate 12. Fastened to the cover plate 12 in such manner as to communicate with the vapor pressures in the interior at the top of the storage tank 10 is a pipe line 13. A manual shut-off valve 14 and a solenoid operated shut-off valve 15 are provided in the pipe line 13 near the end fastened to the cover plate 12. Electric wiring 16 and a control switch 17 are connected to a voltage source (not shown) for controllably actuating the solenoid valve 15 to cause it to be opened or shut. The pipe line 13 is branched at 18 to provide two pipe legs 19 and 20 extending downwardly towards the bottom of tank 10. As shown, the pipe legs 19 and 20 are passed through the walls of the tank 10 and extend downward through the tank interior but it should be understood that such construction is optional since for the purposes of invention either or both of the pipe legs 19 and 20 might well extend downward about the exterior of the tank walls. At the bottom portion of tank 10 the pipe leg 19 is horizontally extended at 21 through the tank wall. A manual shut-off valve 22 is provided in the pipe section 21. A pipe line 23 is connected to the tank wall near the bottom of the tank 10 and is adapted to communicate with the liquid contents within the tank in the bottom portion. Manual shut-off valves 24 and 25 are inserted in series with the pipe line 23 as shown. Pipe line 23 joins the pipe section 21 of the pipe leg 19 at the T-junction 26, and the joint pipe section 27 is bent vertically upward to be connected with the bottom of the calibrated volumetric container 28. Pipe leg 20 connects with the top of the calibrated container 28. Shut-off valves 29 and 30 respectively are provided to operatively control the connection of pipe lines 20 and 27 to the container 28. A drain pipe 31 and drain valve 32 are connected to the bottom of container 28 to drain its contents when desired. It should be pointed out that the calibrated container 28 is provided with a sight gauge 33 to indicate the volumetric liquid contents of container 28 which may, if desired, be calibrated in terms of either liquid level or volume in the storage tank 10 as will be more fully referred to hereinafter.

With the liquid gauging apparatus described above I am enabled to apply a new method of gauging remotely and if desired at ground level the liquid contents of relatively large refinery storage tanks. The novel method of this invention provides for the steps of trapping or collecting in the vertically extending pipe leg 19 a small column of liquid equal in height to the level of liquid in the storage tank and thereafter measuring in the calibrated container 28 the volume of the liquid previously connected in the pipe leg 19. Thus, with the proper calibrations on the sight gauge 33 of the calibrated volumetric container 28, the liquid contents of the tank 10 will be accurately gauged and indicated. Furthermore, the provision of valve 15 and pipe leg 20 equalizes the vapor pressure within the tank and on both sides of the collected liquid volume as it is transferred to the calibrated container.

For a more detailed understanding of the operation of my invention shown in the drawing, consider the following illustrative operating procedure. Assume first that the shut-off valves 14, 22, 24 and 29 are open and that the drain valve 32 has been opened to drain the calibrated container 28 of any liquid that might be in it and has then been closed. Switch 17 is then manipulated to cause the solenoid operated shut-off valve 15 to be opened thus equalizing the vapor pressure in the top of the tank 10 and the pipe legs 19 and 20. At this time shut-off valves 25 and 30 are closed. Valve 25 is then opened, permitting the fluid within tank 10 to pass through open valves 22 and 24 and rise in the pipe leg 19 to a height equal to the height of liquid in the storage tank. There now exists gas of pressure equal to that in the tank in both conduit legs 19 and 20 and a measured column of liquid in leg 19 equal to the depth of the liquid body in the tank. The legs 19 and 20 are separated by the closed valve 30. Valve 30 is then opened slightly to permit the liquid to rise in container 28 until it just can be seen in the sight gauge 33 after which valves 29 and 30 are closed and the liquid in container 28 again is drained by opening drain valve 32. This procedure eliminates any gas pockets that might have been present in the calibrated container 28 and its associated pipe lines. The drain valve 32 is again closed together with solenoid valve 15 and shut-off valve 25, valve 14 remaining open except when cleaning the pipes of the measuring system. Valves 29 and 30 are now opened wide permitting the column of fluid previously trapped in pipe leg 19 to flow into the calibrated volumetric container 28 balanced by a head of vapor pressure equivalent to the vapor pressure in the storage tank on each end of the liquid column admitted to legs 19 and 20 by the operation of the solenoid valve 15. The isolated liquid column of leg 19 balances in the closed conduit system formed with leg 20 through the container 28 and indicates the volume or level of the liquid in the tank under the temperature and vapor pressure conditions existing within the storage tank. Thus the liquid level in the storage tank 10 is readily measured remotely and at ground level if desired by measuring within a properly calibrated container 28 the relative volume of a column of liquid that was in the pipe leg 19, which liquid column is equal in height to the liquid level to be measured in the storage tank.

It will be evident that the structure illustrated and described has the added advantage of enclosing the larger part of the measuring system within the storage vessel. In this way the temperature of the isolated sample conforms very closely with that of the tank contents and eliminates a variable which normally must be calculated. Consequently, the device affords a high degree of accuracy as well as freedom from the objections common to measuring apparatus with moving parts.

It should be obvious that other forms of calibrated measuring containers than that shown in the drawing may be used without departing from the spirit and scope of the invention which is concerned primarily with the measurement at a remote point of the liquid level within a relatively large storage tank by measuring the relative volume of a trapped small column of liquid equal in height to the liquid level within the tank and under the conditions of storage existing therein.

I claim:

1. Apparatus for measuring liquid contents in a sealed pressure vessel for the storage of volatile liquids having a vapor space above the liquid comprising a conduit system of two branches extending downwardly in the vessel passing through the walls thereof at the top and bottom, valve means connecting the upper part of the system to transmit the vapor pressure of said vessel thereto and isolate said pressure condition therein; valve means connecting the lower part of said system to admit and isolate liquid therein, thereby subjecting the admitted liquid to the established pressure condition; and a volumetric liquid measuring container in said conduit system above the lower valve means calibrated to indicate liquid measures proportionate to the liquid contents of the tank.

2. Apparatus for measuring liquid contents in a sealed pressure vessel for the storage of volatile liquids having a vapor space above the liquid comprising a closed conduit loop, a calibrated liquid measuring means connected in the lower part of said conduit loop, a valved connector at the upper end of said loop adapted to cooperate with the vapor space of the vessel for the admission of the vapor space pressure condition to the loop, and a second valved connector at the lower end of the loop below said measuring means to admit liquid to the lower portion of said loop to determine the quantity of stored liquid in a tank by the measurement of proportionate liquid volumes under the pressures of actual storage conditions.

3. Apparatus for measuring liquid contents in a sealed pressure vessel for the storage of volatile liquids comprising a closed conduit loop, a valved conduit adapted to connect said loop and the upper part of the interior of the vessel for transmission to the loop of vapor from the vapor space in the vessel, a calibrated liquid measuring means outside the vessel interposed in said loop, and dividing said loop into sections communicating respectively with the lower and upper ends of the measuring means, and a valved conduit adapted to connect the lower part of the interior of the vessel with the section of the loop communicating with the lower end of the measuring means for transmitting liquid to the last named section.

HAROLD A. QUIST.

References Cited in the file of this patent

UNITED STATES PATENTS

| Number | Name | Date |
|---|---|---|
| 1,944,005 | Del Mar | Jan. 16, 1934 |

FOREIGN PATENTS

| Number | Country | Date |
|---|---|---|
| 327,100 | Germany | Oct. 7, 1920 |